UNITED STATES PATENT OFFICE.

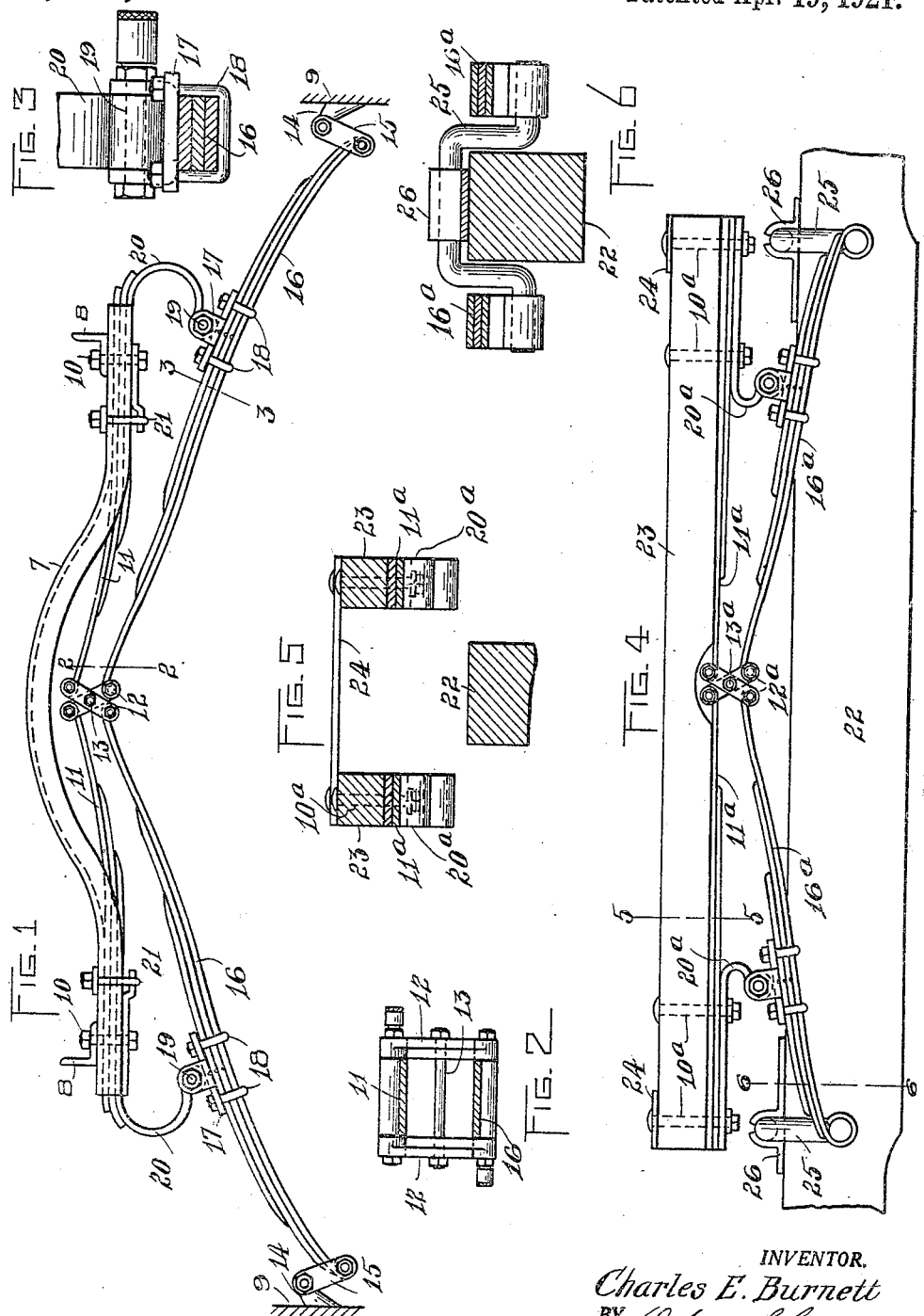

CHARLES E. BURNETT, OF WOLCOTT, NEW YORK.

VEHICLE-BODY SUPPORT.

1,375,556.　　　　Specification of Letters Patent.　　Patented Apr. 19, 1921.

Application filed January 16, 1920. Serial No. 351,880.

*To all whom it may concern:*

Be it known that I, CHARLES E. BURNETT, a citizen of the United States, residing at Wolcott, in the county of Wayne and State of New York, have invented a new and useful Improvement in Vehicle-Body Supports, of which the following is a specification.

The present invention relates to vehicle body supports, an object thereof being to provide a simplified and improved mechanism, especially adaptable for motor vehicles of the Ford type, whereby the vehicle body may at all times be maintained parallel to the vehicle frame, irrespective of the fact that the weight within or upon the vehicle body may not be evenly distributed.

A further object of the invention is to provide an equalizing and shock absorbing mechanism between the vehicle frame and body therefor, which is constructed in such manner that an even elasticity is produced under any and all conditions to which such mechanism may be subjected.

These and other objects pertaining more to details of construction will be clearly set forth in the following description and particularly defined in the appended claims.

The accompanying drawings illustrating the invention are as follows:—

Figure 1 is a side elevation of the vehicle body support applicable as the rear cross spring of a motor vehicle;

Fig. 2 is a sectional detail view taken on the line 2—2 of Fig. 1;

Fig. 3 is a sectional detail view taken on the line 3—3 of Fig. 1;

Fig. 4 is a front elevation of a conventional form of road wagon bolster and illustrating the application of a wagon body support embodying the present invention;

Fig. 5 is a sectional detail view taken on the line 5—5 of Fig. 4;

And, Fig. 6 is a sectional detail view taken on the line 6—6 of Fig. 4.

Similar reference numerals refer to similar parts throughout the several views.

Referring first to Figs. 1, 2 and 3 of the drawings, 7 indicates the rear cross channel bar of a motor vehicle of the Ford type and employing cross springs, such member connecting the longitudinally extending side bars in the usual manner and having rigid connection by means of the angle irons 8 adjacent the ends thereof to the body proper of the vehicle.

Interposed between this cross member and the rear axle housing, fragmentary portions of which are indicated at 9, is the improved yieldable supporting mechanism which is so arranged that the load of the vehicle will be held with proper elasticity, and so that one side of the body supporting frame can not be depressed or elevated a greater degree than the central portion or other side of such frame.

The channel cross bar 7 is inverted and secured to the under face thereof adjacent its ends, by means of bolts 10 which also pass through the angle irons 8, are laminated flat springs 11. These springs extend toward each other, their inner ends being spaced apart and having pivotal connection with the upper ends of shackles 12, the links comprising the shackles of one spring member crossing those of the other spring member and the pair of shackles being pivoted to swing about a common axis 13 which is in a median line between the ends of the bar 7. Thus it will be observed that a downward pull exerted on the shackles will be yieldably resisted in equal measure by the springs 11 and, also, that as the springs are laminated great strength will be afforded the structure.

Mounted for rocking movement on studs 14 carried by the rear axle housing 9 are links or shackles 15, the lower ends of which have pivotal connection with the outer ends of outwardly extending and downwardly inclined leaf or lever springs 16 which are pivotally secured at their innermost ends to the lower ends of the shackles 12. These shackles 12 thus effect a link connection between the left hand lever spring 16 and the right hand flat spring 11, and a similar connection between the right hand lever spring 16 and the left hand flat spring 11, with such links movable in opposite directions about the common axis 13 midway between the ends of the frame bar 7, as above described. It will be observed that these leaf or lever springs 16 are also laminated to afford them the necessary strength.

Each of the lever springs 16 has secured upon its upper surface and adjacent its outer end a fulcrum plate or keeper 17, the latter being held firmly upon their respective springs by the U-bolts 18. These keepers accommodate the bearing pins 19 to which are pivotally connected the downwardly extending ends of the fulcrum irons 20. These irons are secured to the extremities of the supporting frame bar 7 by the bolts 10 and the retaining clamps 21.

In operation, the weight or downward pressure upon the body supporting frame bar 7 intermediate its ends will be equally distributed through the flat springs 11 and lever springs 16 to the axle of the vehicle. When weight is placed upon the body supporting bar 7 beyond the medial portion thereof, the particular mechanism will so equalize or distribute the weight that the supporting bar will remain parallel with the axle. This equal distribution of weight is accomplished through the instrumentality of the fulcrums for the lever springs and the particular method of mounting between the body supporting cross bar and the axle housing. The weight delivered at one end of the cross bar will tend to depress that end, and this depression will lower the fulcrum of the adjacent lever spring. Lowering of the fulcrum will move the inner extremity of the lever spring downwardly, whereupon the inner ends of the flat springs 11 will, through the shackles 12, be lowered and as both shackles 12 for the lever spring ends will move downward together, but in opposite angular directions about their common axis, the fulcrum for the lever spring at the opposite end of the bar will be lowered a distance equal to the degree of movement of the first mentioned fulcrum. In this manner it is seen that the weight is evenly distributed, whereby depression of one side of the body of the vehicle is obviated, and as the levers 16 and 11 are highly elastic the vehicle body is at all times yieldably supported.

In Figs. 4, 5 and 6 there is shown a modification of the invention wherein the general idea above detailed is rendered applicable as a wagon body support. In this form of the invention 22 indicates a bolster such as employed upon the now generally used road wagons or trucks to support the load of the vehicle, and mounted above the bolster is a body supporting frame, the improved spring mechanism being interposed between the bolster and this supporting frame which latter member in this instance comprises a pair of bars 23 connected at their ends by cross or tie plates 24. Two sets of springs substantially similar to those hereinbefore described are employed, there being one set on each side of the bolster and directly under each frame bar 23.

Each set of springs comprises flat springs 11$^a$ secured adjacent their outer ends to the outer ends of their respective frame bar 23 by means of bolts 10$^a$. Shackles 12$^a$ mounted to swing about a common axis 13$^a$ connect the inner ends of these springs with the inner ends of outwardly extending and downwardly inclined lever springs 16$^a$ in the same manner that the shackles 12 connect the springs 11 and 16, the outer ends of these lever springs being pivotally connected to the extremities of the downwardly extending legs of stirrups 25 which straddle the bolster and are mounted for rocking movemnt in suitable bearing plates 26 upon the bolster and adjacent the ends thereof. The stirrup at one end of the bolster is connected to the lever spring each side of such member. The fulcrum irons 20$^a$ are secured to the supporting frame bars, although being bent in the opposite direction to the fulcrum irons 20, and have the lever springs fulcrumed thereto in the manner explained above for the irons 20.

From this description, it is obvious that there has been provided an equalizing mechanism which will operate efficiently to perform the various objects set forth, and danger of breakage or derangement of parts is exceedingly remote. The various levers and springs are so associated with each other that the weight subjected to the vertically movable frame or body is distributed evenly to the running gear of the vehicle.

While the embodiment of the invention herein shown and described is for a vehicle body support, it will readily be understood that the invention is not limited to this use alone.

What I claim is:

1. The combination with a vehicle body and axle, of a pair of leaf springs secured at their outer ends to said body and extending toward each other, a pair of shackles movable about a common axis intermediate their ends and each pivoted at its upper end to the inner end of one of said leaf springs, rocking members carried by said axle, and lever springs disposed beneath said leaf springs and fulcrumed intermediate their ends to said body, each of such lever springs having pivotal connection at its outer end with one of said rocking members and at its inner end with the lower end of one of said shackles, the said shackles connecting each lever spring with its opposite leaf spring.

2. The combination with a vehicle body and axle, of a pair of leaf springs secured at their outer ends to said body and extending toward each other with their inner ends spaced apart, a pair of shackles movable about a common axis intermediate their ends and in a plane midway between the spaced inner ends of said springs, each shackle being pivoted at its upper end to the inner end of one of said leaf springs, rocking members carried by said axle, and lever springs disposed beneath said leaf springs and fulcrumed intermediate their ends to said body, each of such lever springs having pivotal connection at its outer end with one of said rocking members and at its inner end with the lower end of one of said shackles, the said shackles connecting each lever spring with its opposite leaf spring.

3. The combination with a vehicle body and axle, of a pair of leaf springs secured at their outer ends to the body and extending toward each other, rocking members carried by said axle, lever springs disposed beneath said leaf springs and fulcrumed intermediate their ends to the body with their outer ends pivoted to said rocking members, and equalizing means whereby the body will under all conditions remain parallel with the axle comprising a pair of shackles movable in opposite directions about a common axis intermediate their ends and in the median plane of said body, the said shackles connecting the inner end of each lever spring with the inner end of its opposite leaf spring.

4. The combination with a vehicle body and axle, of a pair of leaf springs lying adjacent the under side of said body and secured thereto at their outer ends, rocking members carried by said axle, lever springs disposed beneath said leaf springs, such lever springs being fulcrumed intermediate their ends to said body with their outer ends pivoted to said rocking members and inclined upwardly toward their inner ends, and equalizing means whereby the body will under all conditions remain parallel with the axle comprising a pair of shackles movable in opposite directions about a common axis intermediate their ends and in the median plane of said body, the said shackles connecting the inner end of each lever spring with the inner end of its opposite leaf spring.

5. The combination with a vehicle body and axle, of a pair of leaf springs secured at their outer ends to the body and extending toward each other, rocking members carried by said axle, lever springs disposed beneath said leaf springs and fulcrumed intermediate their ends to the body with their outer ends pivoted to said rocking members, and equalizing means comprising devices connecting the inner end of each lever spring with the inner end of its opposite leaf spring, whereby the said body will under all conditions of load remain parallel with the said axle.

6. The combination with two relatively movable members supported in parallel planes, of a pair of leaf springs secured at their outer ends to one of said members and extending toward each other, rocking members carried by the other of said members, lever springs disposed beneath said leaf springs and fulcrumed intermediate their ends to the said first named member with their outer ends pivoted to said rocking members, and equalizing means comprising devices connecting the inner end of each lever spring with the inner end of its opposite leaf spring, whereby the said first named member will under all conditions of load thereon remain parallel with the said second named member.

CHARLES E. BURNETT.